J. A. KRANTZ

April 26, 1932. LOCK JOINT FOR METAL PIPES Re. 18,444

Original Filed April 16, 1927

Inventor

J. A. Krantz

By Frease and Bond

Attorneys

Reissued Apr. 26, 1932

Re. 18,444

UNITED STATES PATENT OFFICE

JOSEPH A. KRANTZ, OF DOVER, OHIO, ASSIGNOR TO THE REEVES MANUFACTURING COMPANY, OF DOVER, OHIO, A CORPORATION OF OHIO

LOCK JOINT FOR METAL PIPES

Original No. 1,654,738, dated January 3, 1928, Serial No. 184,313, filed April 16, 1927. Application for reissue filed December 18, 1929. Serial No. 415,109.

The invention relates to sheet metal pipes such as stovepipes and the like and more particularly to a lock joint for such pipes.

Lock joints of various kinds have been made in the past for pipes of this kind, but there are various objections to such joints as are now in use as they not only require considerable metal for the forming of the joint but frequently necessitate apertures or slits in the outer surface of the joint which not only detract from the appearance of the pipe but leave sharp protruding edges of the metal, making the same dangerous to handle.

The object of the present invention is to provide a lock joint for a stovepipe or the like in which a minimum amount of metal is required for the formation of the joint, and in which the exterior of the pipe is smooth and unbroken and the exterior of the joint is flush.

Figure 1:
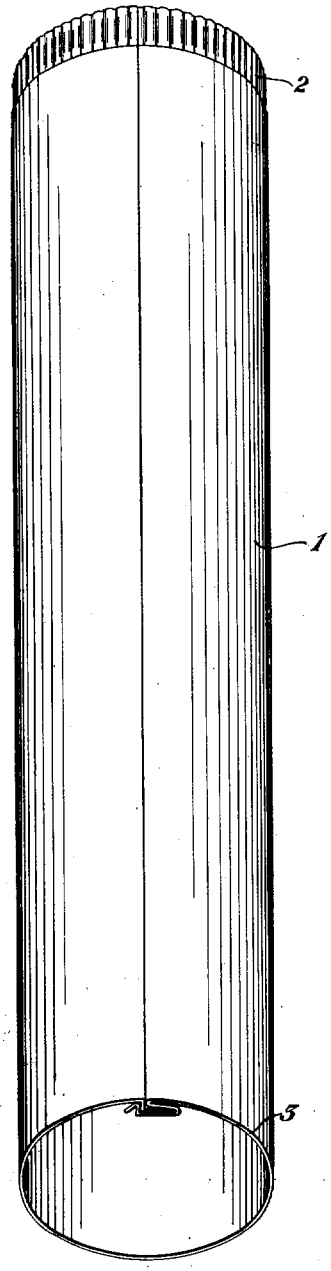
Figure 2:
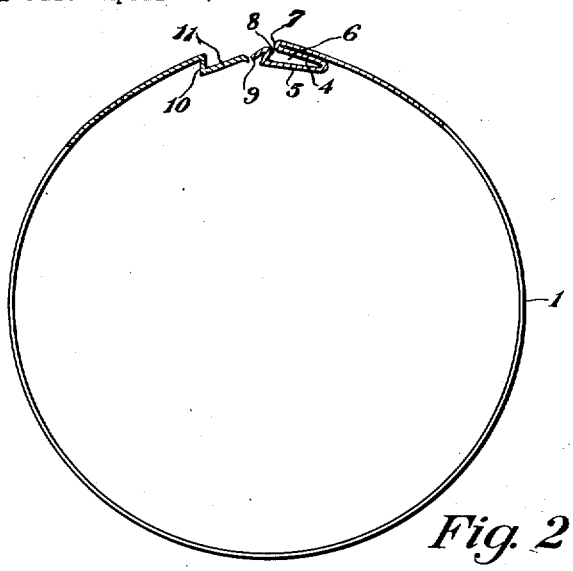
Figure 3:
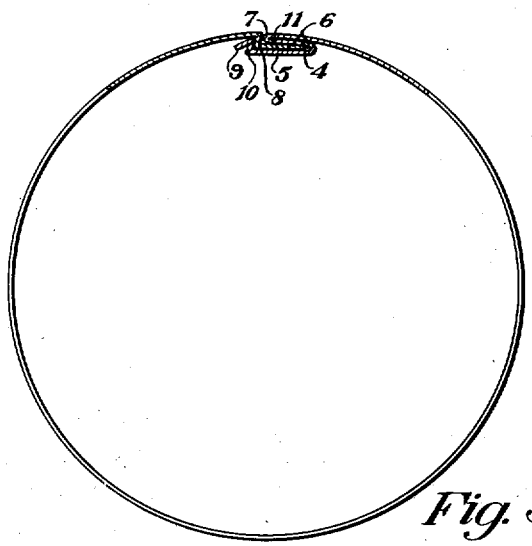
Figure 4:
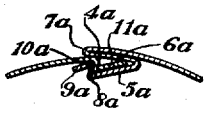

An embodiment of the invention is illustrated in the accompanying drawings, in which Figure 1 is a perspective view of a section of stovepipe provided with the improved lock joint;

Fig. 2, a transverse sectional view through the stovepipe, showing the joint before closure;

Fig. 3, a transverse section through the stovepipe, showing the joint closed and locked, and Fig. 4, a fragmentary sectional view of a modified form of the joint.

Similar numerals refer to similar parts throughout the drawings.

It should be understood that in the manufacture of stovepipe and the like, it is desirable to provide a joint which may be easily and readily closed without the use of tools or machinery, thus permitting the sections of pipe to be shipped in open or unlocked position, permitting nesting of the pipe sections in order to conserve shipping space.

A section of stovepipe is indicated generally at 1, being formed of sheet metal and having one end reduced and crimped as at 2 in order to be inserted into the normal end 3 of a similar section.

In forming the improved lock joint, one longitudinal edge of the pipe section has a female member formed thereon, and is folded back upon itself as shown at 4 upon the interior of the pipe and then folded in the reverse direction as shown at 5, substantially parallel to the portion 4, and forming the groove 6.

The flange 5 extends slightly beyond the folded edge 7 and terminates in an angular rearwardly disposed hooked locking shoulder 8 of substantially S-shape, which may be strengthened by the angular flange 9.

The opposite edge of the pipe section forms a male member and is bent inwardly and rearwardly, forming a hooked locking shoulder 10 of substantially S-shape, within the cylindric peripheral wall 1 of the pipe and terminating in the outwardly inclined angular flange 11 which may be substantially the width of the groove 6, and which is located inside of the plane of the wall 1 of the pipe.

The pipe sections are formed in this manner at the shop and may be nested for shipping, there being sufficient resilience in the sheet metal of which the pipe sections are formed to permit a considerable number of sections to be placed one within the other in this open condition.

When it is desired to close the joint of a section, it is only necessary to insert the angular flange 11 into the groove 6 and press the edges of the section together, the locking shoulder 10 hooking over and interlocking with the locking shoulder 8 as shown in Figs. 1 and 3, holding the joint locked in closed position.

When the joint is once locked, it will be seen that it cannot accidentally open and any pull exerted upon opposite sides of the section will only tend to pull the shoulder 10 more tightly against the shoulder 8, holding the same in interlocked condition.

A slight modification of the joint is shown in Fig. 4, in which the flange 5*a* and groove 6*a* are shortened, the shoulder 8*a* being formed inside of the folded edge 7*a*. In this form of the joint the flange 9*a* may be of greater width than shown in the preferred form in order to extend beyond the folded edge 7*a* to assist in inserting the flange 11*a* of the other edge of the section. This flange 11*a* will, of course, be narrower than shown in Figs. 1 to 3 in order to fit within the narrowed groove 6*a*.

From the above description and an inspection of the accompanying drawings, it will be seen that a very simple and efficient lock joint is provided in which a minimum amount of metal is used for the formation of the joint; in which the exterior of the pipe section is flush at the joint; and in which the joint is easily and readily closed and locked against opening.

I claim:

1. A pipe section comprising a metallic sheet, one margin of which is folded flat against the inside of the sheet and then refolded to form a flange spaced from the first named fold and defining a groove, said flange terminating in a rearwardly disposed hooked locking shoulder, the other margin of the sheet being insertable into said groove and having a rearwardly disposed angularly hooked locking shoulder arranged at an acute angle to the adjacent surface of the pipe section for locking engagement with the first named locking shoulder, the hooked locking shoulders being located within the cylindric peripheral wall of the pipe, the exterior of the pipe being smooth and unbroken and the exterior of the joint being flush.

2. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder, the other margin of the sheet being insertable into said groove and having a rearwardly disposed angularly hooked locking shoulder arranged at an acute angle to the adjacent surface of the pipe section for locking engagement with the first named locking shoulder, the hooked locking shoulders being located within the cylindric peripheral wall of the pipe, the exterior of the pipe being smooth and unbroken and the exterior of the joint being flush.

3. A pipe section comprising a metallic sheet, one margin of which is folded flat against the inside of the sheet and then refolded to form a flange spaced from the first named fold and defining a groove, said flange terminating in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder, the hooked locking shoulders being located within the cylindric peripheral wall of the pipe, the exterior of the pipe being smooth and unbroken and the exterior of the joint being flush.

4. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder, the hooked locking shoulders being located within the cylindric peripheral wall of the pipe, the exterior of the pipe being smooth and unbroken and the exterior of the joint being flush.

5. An interlocking pipe seam comprising a male formation along one edge and an interlocking female formation along the other edge, the female formation comprising a reversely bent edge providing spaced walls enclosing a pocket opening at the edge of the pipe, and a rearwardly hooked bead in the terminal wall of the said pocket, the male formation having a portion located inside the plane of the wall of the pipe and receivable within the pocket at the rear of the bead.

6. An interlocking pipe seam comprising a male formation along one edge and an interlocking female formation along the other edge, the female formation comprising a reversely bent edge providing spaced walls enclosing a pocket opening at the edge of the pipe, and a rearwardly hooked locking shoulder of substantially S-form in the terminal wall of the said pocket, the male formation having a portion located inside the plane of the wall of the pipe and receivable within the pocket at the rear of the locking shoulder.

7. An interlocking pipe seam comprising a male formation along one edge and an interlocking female formation along the other edge, the female formation comprising a reversely bent edge providing spaced walls enclosing a pocket opening at the edge of the pipe, and a rearwardly hooked bead in the terminal wall of the said pocket, the male formation having a portion located inside the plane of the wall of the pipe and receivable within the pocket at the rear of the bead, said bead being located within the mouth of the pocket.

8. An interlocking pipe seam comprising a male formation along one edge and an interlocking female formation along the other edge, the female formation comprising a reversely bent edge providing spaced walls enclosing a pocket opening at the edge of the pipe, and a rearwardly hooked locking shoulder of substantially S-form in the terminal wall of the said pocket, the male formation having a portion located inside the plane of the wall of the pipe and receivable within the pocket at the rear of the locking shoulder, said locking shoulder being located within the mouth of the pocket.

9. An interlocking pipe seam comprising a male member and a female member, the former having a portion thereof located within the plane of the wall of the pipe to provide an interlocking formation and the latter having a pocket therein formed by bending the metal of the pipe upon itself to form two spaced walls, and an interlocking formation extending along one of the walls consisting of a double crimped locking shoulder forming a rearward hook in substantially S-form.

10. An interlocking pipe seam having a male and a female edge, the female edge consisting of three layers of metal formed by bending the metal upon itself, the terminal layer being spaced from its next adjacent layer to provide a pocket, and an interlocking formation comprising a double hooked bead extending the entire length of the pocket and located within the mouth thereof.

11. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double hooked locking shoulder formed by crimping the metal of a single layer upon itself.

12. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double hooked locking shoulder formed by crimping the metal of the terminal layer upon itself.

13. An interlocking pipe seam having a male and a female edge, the female edge consisting of three layers of metal formed by bending the metal upon itself, the terminal layer being spaced from its next adjacent layer to provide a pocket, and a double hooked interlocking formation upon the terminal layer extending the entire length of the pocket and located within the mouth thereof, the male edge having a tongue and an interlocking formation on the tongue receivable within the pocket at the rear of the interlocking formation on the female member.

14. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double hooked locking shoulder formed by crimping the metal of a single layer upon itself, the male edge having a tongue and an interlocking formation on the tongue receivable within the pocket at the rear of the interlocking formation on the female member.

15. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double hooked locking shoulder formed by crimping the metal of the terminal layer upon itself, the male edge having a tongue and an interlocking formation on the tongue receivable within the pocket at the rear of the interlocking formation on the female member.

16. An interlocking pipe seam having a male and a female edge, the female edge consisting of three layers of metal formed by bending the metal upon itself, the terminal layer being spaced from its next adjacent layer to provide a pocket, and an interlocking double hooked formation upon the terminal layer extending the entire length of the pocket and located within the mouth thereof, the male edge having a tongue and an interlocking formation on the tongue similar to the interlocking formation on the female member receivable within the pocket at the rear of the interlocking formation on the female member.

17. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double crimped locking shoulder formed by crimping the metal of a single layer upon itself, the male edge having a tongue and an interlocking formation on the tongue similar to the interlocking formation on the female member receivable within the pocket at the rear of the interlocking formation on the female member.

18. An interlocking pipe seam having a male and a female edge, the female edge consisting of three layers of metal formed by bending the metal upon itself, the terminal layer being spaced from its next adjacent layer to provide a pocket, and an interlocking formation extending the entire length of the pocket and located within the mouth thereof, said formation comprising a double crimped locking shoulder formed by crimping the metal of the terminal layer upon itself, the male edge having a tongue and an interlocking formation on the tongue similar to the interlocking formation on the female member receivable within the pocket at the rear of the interlocking formation on the female member.

19. An interlocking pipe seam comprising a male formation along one edge and an interlocking female formation along the other edge, the female formation comprising a reversely bent edge providing spaced walls enclosing a pocket opening at the edge of the pipe and a substantially S form reverse hook in one wall of said pocket, the male formation having a portion located inside the plane of the wall of the pipe and receivable within the pocket between said hook and the opposite side of the pocket.

20. A pipe section comprising a metallic sheet, one margin of which is folded upon itself and then refolded defining a groove and terminating in a rearwardly disposed locking shoulder with a reinforcing flange at its edge, the other margin of the sheet being insertable into said groove and having a shoulder for locking engagement with said locking shoulder, the hooked locking shoulders being located within the cylindric peripheral wall of the pipe, the exterior of the pipe being smooth and unbroken and the exterior of the joint being flush.

21. An interlocking pipe seam having a male and a female edge, the female edge consisting of three layers of metal formed by bending the metal upon itself, the terminal layer being spaced from its next adjacent layer to provide a pocket, and a substantially S-shaped interlocking formation extending the entire length of the pocket and located within the mouth thereof.

22. An interlocking pipe seam comprising a male formation along one edge and an interlocking female formation along the other edge, the female formation comprising a reversely bent edge providing spaced walls enclosing a pocket opening at the edge of the pipe, and a double rolled bead of S-form in the inner wall of the said pocket, the male formation having a portion located inside the plane of the wall of the pipe and receivable within the pocket at the rear of the bead.

23. An interlocking pipe seam comprising a male member and a female member, the former having a portion thereof located inside the plane of the wall of the pipe to provide an interlocking formation and the latter having a pocket therein formed by bending the metal of the pipe upon itself to form two spaced walls, and an interlocking formation extending along one of the walls consisting of a double crimped roll in substantially S-form.

JOSEPH A. KRANTZ.